US006679658B2

(12) United States Patent
Landt

(10) Patent No.: US 6,679,658 B2
(45) Date of Patent: Jan. 20, 2004

(54) QUARTER TURN ACCESSORY COUPLING APPARATUS

(75) Inventor: Michael E. Landt, Chicago, IL (US)

(73) Assignee: S-B Power Tool Corporation, Broadview, IL (US)

(*) Notice: Subject to any disclaimer, the term of this patent is extended or adjusted under 35 U.S.C. 154(b) by 0 days.

(21) Appl. No.: 10/215,709

(22) Filed: Aug. 9, 2002

(65) Prior Publication Data

US 2003/0044252 A1 Mar. 6, 2003

Related U.S. Application Data

(60) Provisional application No. 60/311,553, filed on Aug. 10, 2001.

(51) Int. Cl.[7] .................................................. B23C 1/20

(52) U.S. Cl. ....................... 409/182; 409/175; 409/178; 409/181; 144/136.95; 451/360

(58) Field of Search ......................... 144/136.95, 154.5; 409/182, 178, 181, 175; 451/360

(56) References Cited

U.S. PATENT DOCUMENTS

| | | | | | |
|---|---|---|---|---|---|
| 4,088,164 | A | * | 5/1978 | McCord, Jr. | 409/182 |
| 4,102,370 | A | * | 7/1978 | Vess | 409/182 |
| 4,566,512 | A | * | 1/1986 | Wilson | 409/181 |
| 4,640,324 | A | * | 2/1987 | Lounds | 409/182 |
| 4,942,912 | A | * | 7/1990 | Gakhar et al. | 144/136.95 |
| 5,117,879 | A | * | 6/1992 | Payne | 409/182 |
| 5,146,965 | A | * | 9/1992 | Gibson | 409/125 |
| 5,662,440 | A | * | 9/1997 | Kikuchi et al. | 409/182 |
| 6,158,930 | A | * | 12/2000 | Etter | 409/180 |

* cited by examiner

*Primary Examiner*—A. L. Wellington
*Assistant Examiner*—Dana Ross
(74) *Attorney, Agent, or Firm*—Greer, Burns & Crain, Ltd.

(57) ABSTRACT

A combined rotary hand tool and accessory attachment includes a rotary hand tool having an output shaft and a nose end associated with the shaft. An accessory attachment has a mounting portion configured for releasable attachment to the nose end and an engagement formation provided to the nose end and the mounting portion and configured so that the mounting portion is securable upon the nose end upon an approximate ¼ relative rotation.

18 Claims, 5 Drawing Sheets

QUARTER TURN ACCESSORY COUPLING APPARATUS

RELATED APPLICATION

This application is a continuation of U.S. Provisional Patent Application Ser. No. 60/311,553, filed Aug. 10, 2001.

The present invention generally relates to coupling mechanisms for tools and the like and more particularly to a mechanism for coupling an accessory attachment to a rotary hand tool.

There has been continued innovation and improvement in the research and design relating to power tools, particularly rotary hand tools of the type that are used in woodworking, metal working and the like. Representative products of this type are those produced by Dremel of Racine, Wis., which also produces many accessory attachments for such rotary hand tools. The rotary hand tools are generally cylindrical in shape and have a motor unit with a rotary output shaft that is configured for driving the various rotary tools such as small saw blades, sander discs, grout removal tools and various shaped cutting tool bits. There are also many accessory attachments that can be used in association with the rotary tools, with the accessory attachments being connected to the stationary nose end portion of the rotary tool. Among such accessory attachments are a grout-removing tool guide that conveniently positions the grout-removing bit relative to the tool guide so that a user can conveniently and effectively remove grout from between individual floor and wall ceramic tiles, for example. Also, a depth guide is a desirable accessory attachment that can be used with many types of cutting tools to limit the depth of penetration of the tool into a work piece or work surface.

While such accessory attachments have been available for many years, the manner in which the accessory attachments are coupled to the tool has been the subject of continuing efforts to provide a simple and effective mechanism for coupling or mounting the accessory attachments to the hand tool itself. In this regard, the necessity of tightening holding screws or utilizing multiple turns of a threaded coupling mechanism for coupling the accessory attachment to the rotary hand tool, while effective, are not considered to be particularly simple and convenient in many past designs.

SUMMARY OF THE INVENTION

The present invention is directed to a particularly simple, elegant and convenient accessory attachment mechanism for attaching an accessory attachment to a rotary hand tool of the type that has a stationary nose end portion adjacent the output shaft of the rotary hand tool. The present invention enables an accessory attachment to be placed on the stationary nose end portion and rotated by a small amount, such as ¼ of a rotation or turn, to securely lock the accessory attachment into place.

More particularly, the present accessory attachment is provided with a pair of opposed inwardly protruding bosses on opposite sides of the inside of the accessory attachment, which bosses engage a pair of outwardly extended elongated arcuate teeth located on the nose end portion of the rotary hand tool, with each of the teeth extending approximately 90° to 100° of the circumference of the cylindrical nose end portion and being curved in the axial direction so that the center of the tooth is moved in the axial direction rearwardly or away from the end of the nose end portion.

Thus, during operation, when the accessory attachment is slipped onto the nose end portion, so that the bosses are adapted to engage the teeth, an approximately ¼ rotation in either direction will engage the tooth and pull the accessory attachment in the rearward direction as a result of the curvature of the tooth, until it is pulled onto the nose end portion to its maximum extent. The accessory attachment also preferably includes at least two interior notches at the end of the accessory attachment that are configured for engaging a biased pin that is provided in the nose end portion of the rotary tool so that during the approximately ¼ rotation, the end of the accessory attachment will engage and depress the pin until the pin is coextensive with the recess, whereupon it will be released to hold the accessory attachment in place. In the preferred embodiment, the recesses have ramped surfaces to enable a user to rotate the accessory attachment and thereby depress the pin and easily disconnect the accessory attachment with a relatively modest force.

DETAILED DESCRIPTION

Figure 1:
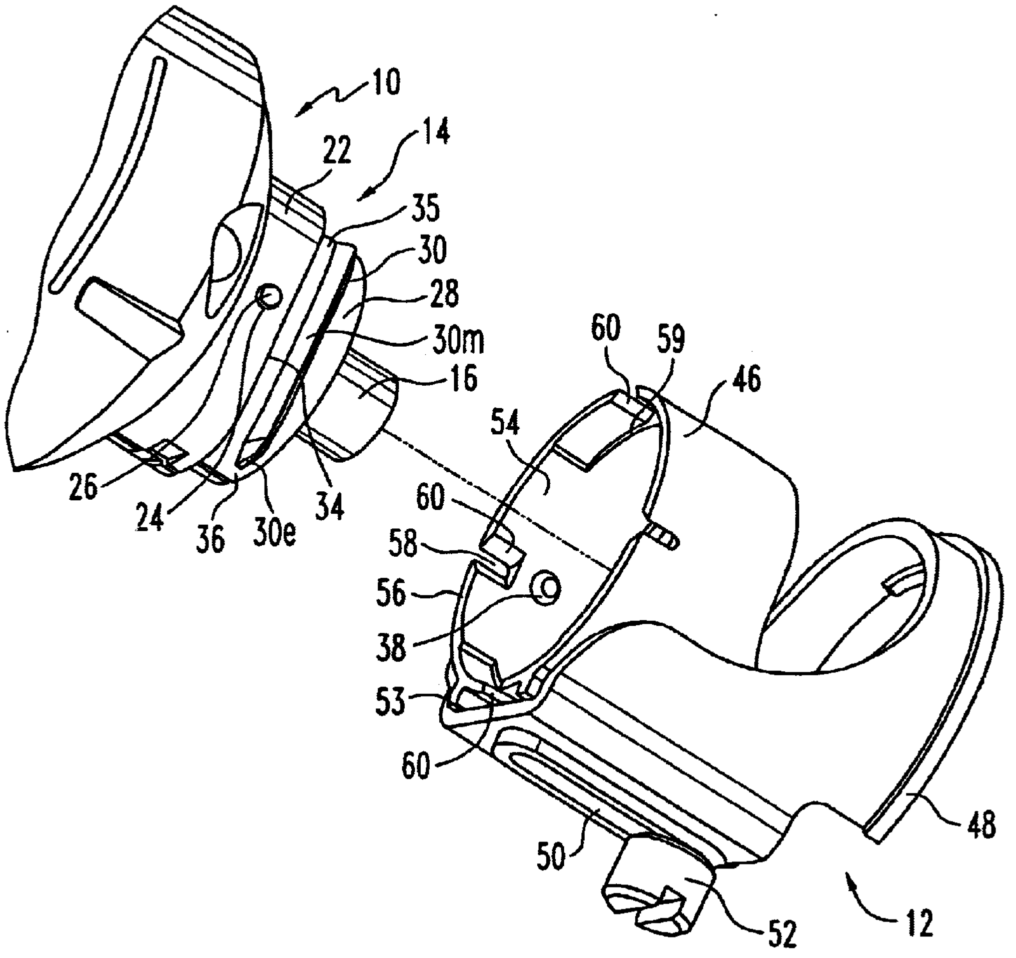
FIG. 1 is a perspective view of a portion of a rotary hand tool shown with a separated depth guide accessory attachment, both of which embody the present invention.
Figure 2:
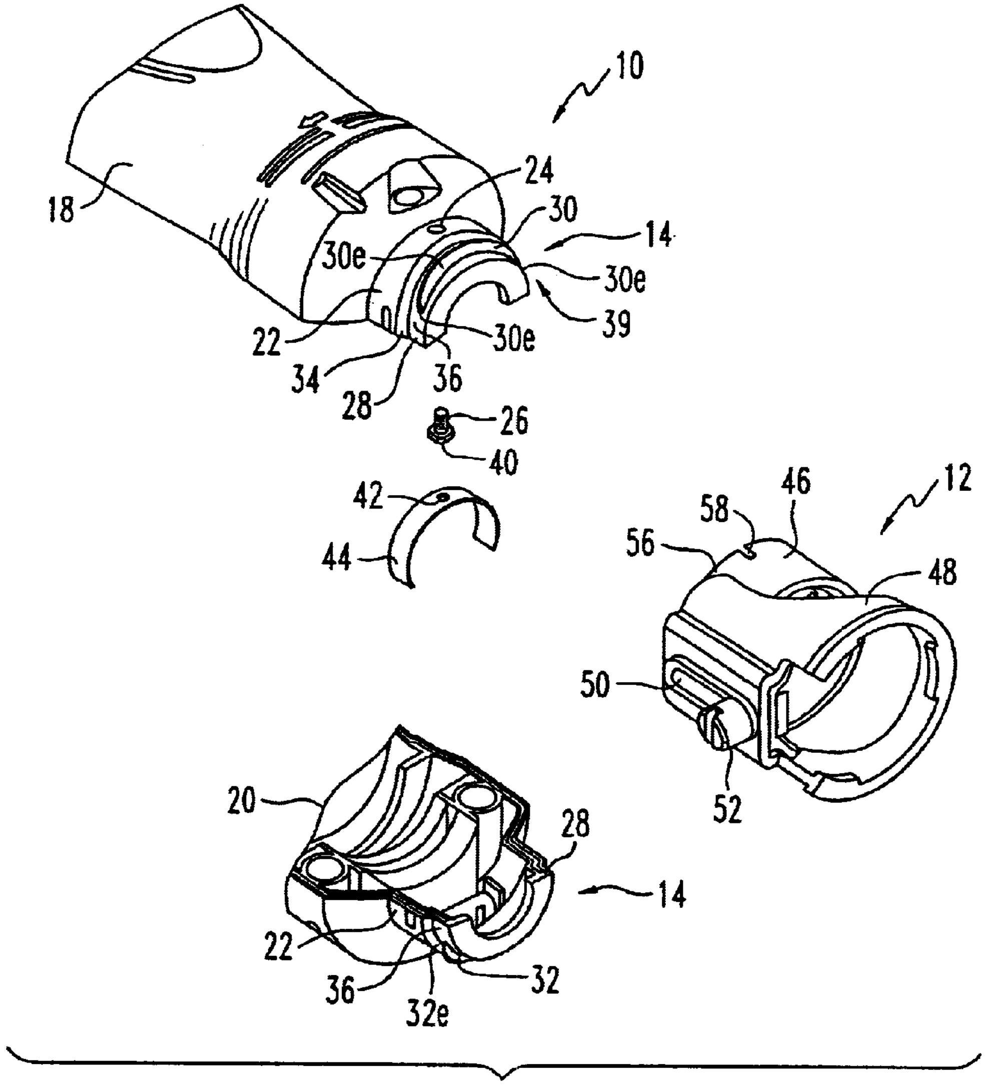
FIG. 2 is an exploded perspective view of a portion of the rotary hand tool shown with the depth guide accessory attachment in FIG. 1.

The accessory attachment mechanism embodying the present invention is shown in the perspective views of FIGS. 1 and 2, where a rotary hand tool is indicated generally at 10 and is shown in conjunction with a depth guide accessory attachment indicated generally at 12. The rotary hand tool 10 has a nose end portion or nose end indicated generally at 14 and an output shaft 16 (FIG. 1) which is diagrammatically illustrated and is intended to be attachable to a working tool (not shown) such as a small circular saw blade, a cutting, polishing or drilling bit or the like, as is well known in the art.

As particularly shown in FIG. 2, the hand tool 10 has an outer housing including two mating portions 18 and 20 which mate together and house the motor and drive shaft which are not shown in the drawings. The nose end portion 14 is formed with the housing 18, 20 and has a generally cylindrical, relatively enlarged diameter portion 22 provided with an opening 24 through which a pin 26 protrudes. Forwardly of the portion 22 is another cylindrical shaped portion 28 and this portion contains at least one and preferably a pair of outwardly extending elongated teeth 30 and 32, each of which is curved in the axial direction so that a middle portion 30*m* is more rearward positioned from an end of the nose end portion than either of two ends 30*e* of the teeth.

The interface between the larger cylindrical portion 22 and the cylindrical portion 28 forms an annular shoulder 34, and the distance between the shoulder and any corresponding axially-oriented portion of the teeth 30, 32 is substantially constant as best shown in FIG. 1. In other words, the shoulder 34 has the same curvature in the axial direction as the teeth 30, 32. A curved track 35 is thus formed in the space between the teeth 30, 32 and the shoulder 34. Each of the teeth 30, 32 extends around the periphery of the cylindrical portion 28 approximately 90°, although it may extend to 120° or more if desired. Thus, the teeth 30, 32 are circumferentially spaced from each other about the nose end 14. The only restriction is that a reasonable space 36 between the adjacent ends 30*e*, 32*e* of both teeth 30, 32 must be provided to enable at least one and preferably both of a pair of inwardly, radially extending bosses 38 (FIG. 3) to pass beyond of the ends of the teeth when the accessory attachment 12 is being coupled to the rotary hand tool 10. The teeth 30, 32, the shoulder 34 and the bosses 38 are collectively referred to as the engagement formation 39.

As best shown in FIG. 2, the pin 26 protrudes through the aperture 24 in the cylindrical portion 22. The pin 26 has an annular flange 40 that is located intermediate the opposite ends of the pin so that a lower portion of the pin may fit within an aperture 42 in a spring 44 that is held within the interior of the housing portions 18 and 20. The spring 44 is sufficiently resilient that it biases the pin 26 upwardly so that the pin protrudes through the aperture 24, but permits the pin to be depressed radially inwardly so that the accessory attachment 12 can be coupled to the rotary tool 10.

Turning now to the depth guide accessory attachment 12, it includes a cylindrical mounting portion 46 which is slideably attached to a guide portion 48 by means of a slot 50 located in the guide portion 48 in which a fastener 52, such as a threaded screw having one of a variety of head configurations (slotted, Phillips, thumbscrew) passes to threadably engage a captive nut in the mounting portion 46. As shown in FIG. 1, if the screw 52 is loosened, the guide portion 48 can be extended to the right relative to the mounting portion 46 to control the guide depth of a tool that may be attached to the output shaft 16. Tightening of the screw 52 secures the guide portion 48 in the desired position. A sliding guide 53 maintains the relative alignment of the guide portion and the mounting portion 46.

In accordance with an important aspect of the present invention, the mounting portion 46 includes at least one and preferably a pair of the inwardly protruding bosses 38, only one of which is visible in FIG. 1. Preferably diametrically opposite one another on an interior wall 54 of the mounting portion 46, the bosses 38 are spaced inwardly in the axial direction from an outer end wall or surface 56 of the mounting portion 46. Further, the bosses 38 are configured for engaging the teeth 30 and 32, and are slidably engaged in the track 35 when the accessory attachment 12 is coupled to the rotary tool 10. In this regard, the bosses 38 protrude inwardly a distance approximately equal to the height of the teeth 30, 32, however each boss 38 is short enough to clear the cylindrical portion 28 on which the teeth 30 and 32 are located.

Thus, when the accessory attachment 12 is rotated so that the bosses 38 are not coextensive with the teeth 30, 32, the accessory attachment can be pushed onto the nose end portion 14 a distance sufficient that the bosses 38 are positioned rearwardly of the ends of the teeth. At that point, the user can rotate the accessory attachment 12 so that the bosses 38 engage the teeth 30, 32 and pull the accessory attachment axially to the left as shown in FIG. 1 which is also rearwardly on the tool 10 and away from the drive shaft 16. Approximately ¼ of a turn or relative rotation will result in the accessory attachment 12 completing the extent of its travel onto the nose end portion 14. It is also contemplated that the bosses 38 could be attached to the nose end portion 14 and the teeth 30, 32 could be attached to the mounting portion 46.

The mounting portion 46 also has a number of axial slots 58 with angled faces 60 located at approximately 90° intervals along the periphery at the end wall 56 of the mounting portion. The angled faces 60 of the slots 58 facilitate engaging and releasing the pin 26 during coupling and decoupling of the accessory attachment 12. As the accessory attachment 12 is first placed on the nose end portion 14 for coupling the same, the end surface or wall 56 is near but not in contact with the pin 26 as the accessory attachment is slid onto the nose end portion and the bosses 38 are positioned beyond the end of the teeth 30, 32.

Thereafter, when the user begins to rotate the accessory attachment 12, the end wall 56 will engage the pin and depress it as the accessory attachment is rotated. When it is rotated approximately 90°, or ¼ relative rotation, the pin 26 will engage one of the slots 58 and be released to hold the accessory attachment 12 in position. However, by virtue of the angled surfaces 60 of each of the slots 58, the user can easily remove the attachment 12 with moderate force that is with almost anyone's capability. The pin 26 and the slot 58 form a locking assembly for locking the accessory attachment 12 in the secured position upon the above-described ¼ relative rotation. In some cases, the slots 58 may be located in recesses 59 in the inner wall 54.

The symmetrical nature of the curvature of the teeth 30, 32 is such that the accessory attachment 12 can be coupled and uncoupled by rotating the same in either the clockwise or counterclockwise direction.

Figure 3:
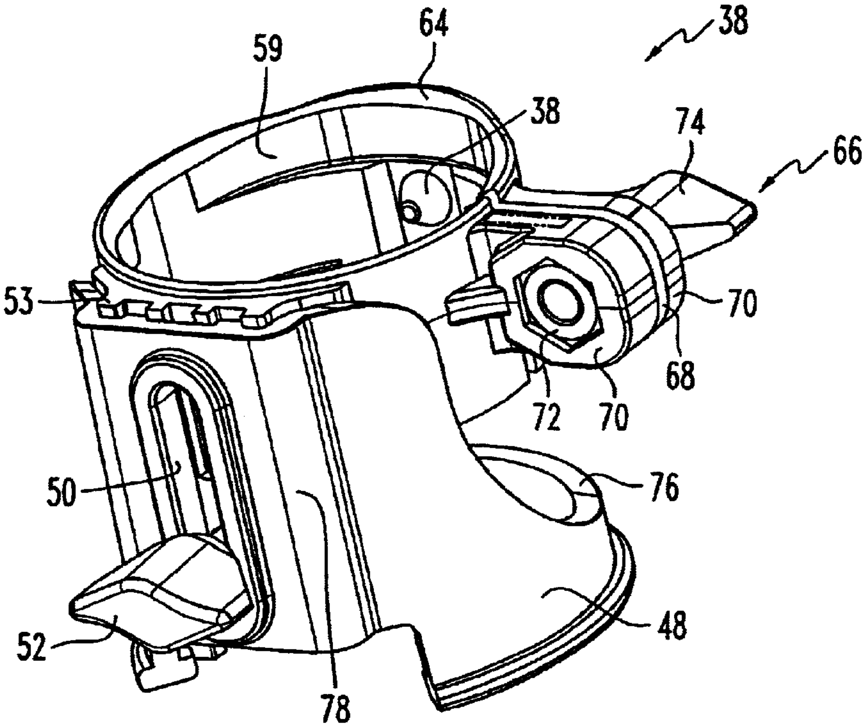
FIG. 3 is a side perspective elevation of an alternate embodiment of the accessory attachment of FIG. 1.
Figure 4:
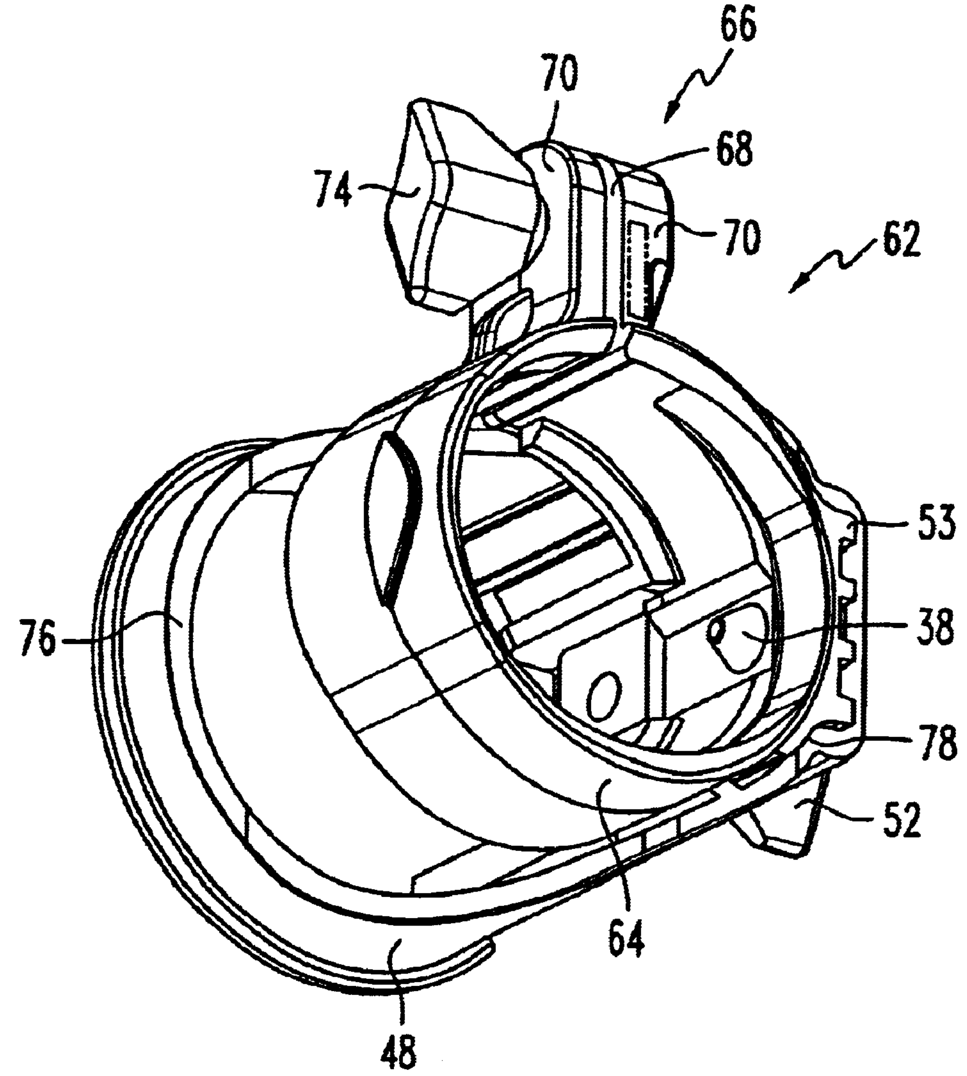
FIG. 4 is a top perspective view of the embodiment of FIG. 3.

Referring now to FIGS. 3 and 4, an alternate embodiment of the accessory attachment is generally designated 62. The attachment 62 shares many components with the attachment 12, and the shared components are designated with identical reference numbers. In the attachment 62, the main variation from the attachment 12 is that, in addition to the quarter-turn structure described above, instead of having the pin 26 and the axial slots 58, a generally cylindrical mounting portion 64 is releasably locked to the nose end portion 14 of the tool 10 by a clamp, generally designated 66. The clamp 66, which provides an alternate locking assembly, includes a gap or slit 68 in the mounting portion 64 which is sandwiched between a pair of radially extending ear formations 70. In the preferred embodiment, the ear formations 70 are secured to each other by a threaded fastener, including a captured nut 72 on one ear formation, and a threaded thumbscrew 74 or other type of threaded fastener passing through the other ear formation to threadably engage the nut 72. It is contemplated that other adjustable fasteners may be employed, and that the nut 72 and the thumbscrew 74 may be disposed on either of the ear formations 70. By tightening the thumbscrew 74, the ear formations 70 are brought together, closing the gap 68, tightening or reducing the diameter of the mounting portion 64 at the outer end 56, and thus lockingly attaching the attachment 62 to the tool 10.

The clamp 66 replaces the pin 26 and the associated spring 44 associated with the tool 10 when the attachment 12 is employed. Instead, once the accessory attachment 62 is engaged upon the teeth 30, 32 as described above and rotated ¼ turn, the thumbscrew 74 is tightened to grip and releasably lock the attachment 62 upon the tool 10 in the desired position.

Figure 5:
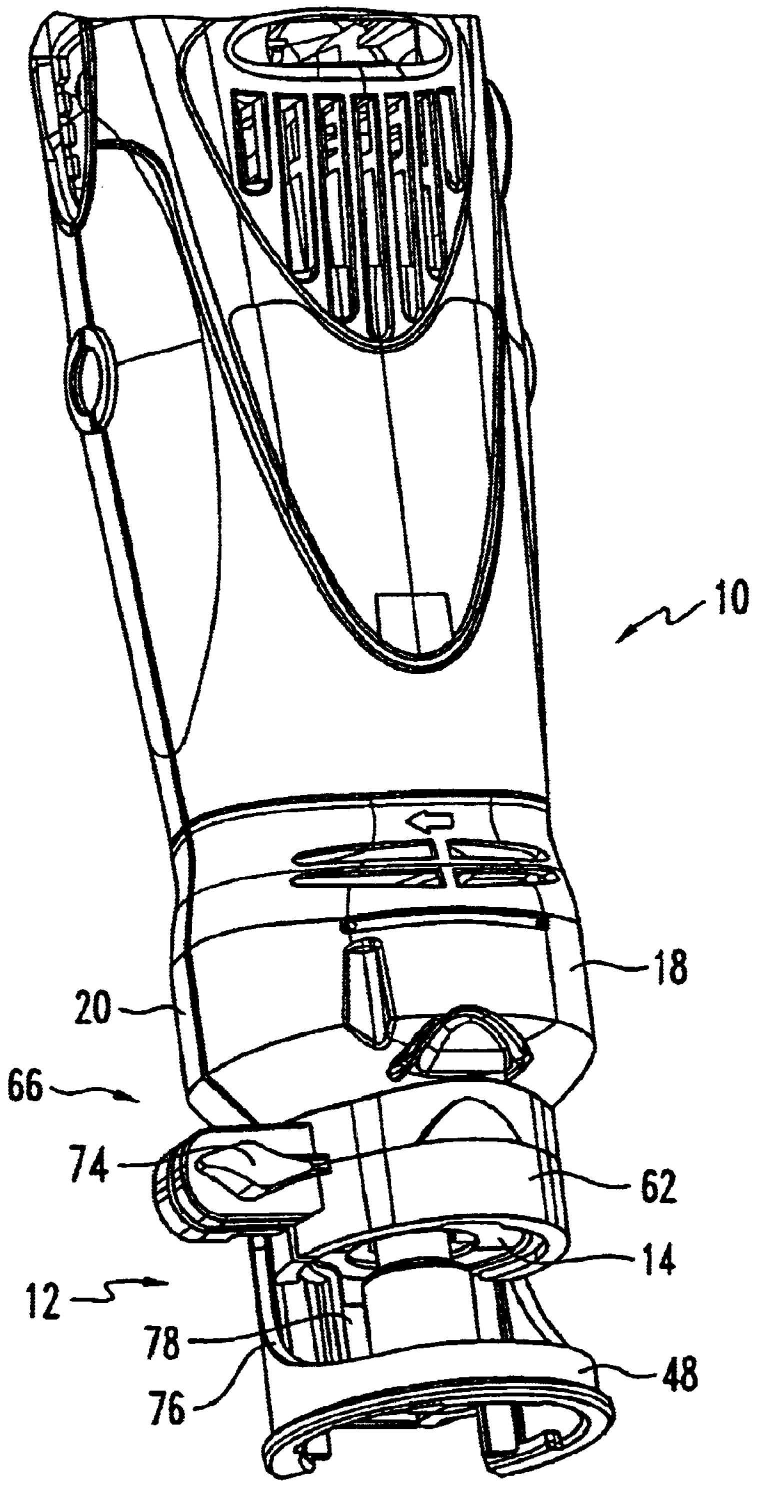
FIG. 5 is a side perspective view showing the attachment secured to the tool (partially shown) for enhanced user visibility.

Referring to FIGS. 3–5, another feature of the accessory attachment 62 is that the bosses 38 have been rotated 90° relative to the rest of the mounting portion 64 as compared to the position of the bosses 38 on the mounting portion 46. This disposition of the bosses 38 has been found to increase user visibility of the operation being performed by the tool

10 upon a workpiece, in that, with the rotated position of the bosses, a cutout area 76 of the guide portion 48 directly faces the operator (best seen in FIG. 5), and a sliding guide adjustment formation 78 associated with the slot 50 and the fastener 52 is located behind the bit attached to the drive shaft 16.

From the foregoing, it should be understood that a coupling mechanism has been shown and described that is simple, and elegant in its design, is convenient and effective to use. While the preferred embodiment illustrated herein has two opposed teeth 30, 32 cooperating with two bosses 38, it should be understood that the present invention could encompass three equally circumferentially spaced teeth 30, 32 and three equally circumferentially spaced bosses, with the slots 58 being appropriately positioned to hold the accessory attachment in its desired position.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

What is claimed is:

1. A combined rotary hand tool and accessory attachment, comprising:

- a rotary hand cool having an output shaft and a nose end associated with said shaft;
- an accessory attachment having a mounting portion configured for releasable attachment to said nose end;
- an accessory formation provided on said nose end and said mounting portion and configured so that said mounting portion is securable upon said nose end upon an approximate ¼ relative rotation;
  - said engagement formation includes at least one tooth with a middle portion and a pair of ends, said middle portion being curved in the direction of a longitudinal axis of the tool so that said middle portion is farther from an end of said nose than said ends of said at least one tooth;
  - said at least one tooth defining a track for engagement of a corresponding member of the other of said nose end and said mounting portion so that upon engagement in said track, and rotation of said attachment relative to said engagement formation said approximate ¼ relative rotation, said member moves from said end of said at least one tooth to said middle portion and thus is axially displaced away from said end of said nose.

2. The combination of claim 1 wherein said engagement formation includes a pair of spaced elongate teeth on one of said nose end and said mounting portion, and said corresponding member is at least one boss on the other of said nose end and said mounting portion.

3. The combination of claim 2, further including two of said teeth circumferentially spaced from each other on said nose end such that said member engages said track between said spaced teeth.

4. The combination of claim 2 wherein said nose end is further provided with an annular shoulder, and said engagement formation is constructed and arranged so that said at least one boss is slidably engageable between said teeth and said annular shoulder upon engagement of said mounting portion and said nose end.

5. The combination of claim 4 wherein said annular shoulder having the same curvature in the axial direction as said corresponding at least one tooth.

6. The combination of claim 1 wherein said attachment includes a guide portion slidably joined to said mounting portion.

7. The combination of claim 1 further including a locking assembly on said tool for retaining said attachment in position relative to said nose end.

8. The combination of claim 7 wherein said locking assembly includes a biased pin radially extending from said nose end and at least one axial slot on said mounting portion, said pin being constructed and arranged for matingly engaging said at least one slot upon said attachment becoming secured to said nose end, said locking assembly being disposed adjacent said middle portion of said at least one tooth.

9. The combination of claim 8 wherein said at least one slot has angled faces for facilitating engagement and release of said biased pin upon rotation of said mounting portion relative to said nose end.

10. The combination of claim 7 wherein said locking assembly includes a clamp on said mounting portion for gripping said nose end upon engagement with said nose end.

11. The combination of claim 10 further including a fastener disposed on said mounting portion for tightening said clamp upon said nose end.

12. The combination of claim 1 wherein said accessory attachment further includes a guide portion slidably attached to said mounting portion, said guide portion having a cutout area for facilitating visibility of a workpiece.

13. The combination of claim 12 wherein said engagement formation is constructed and arranged so that said cutout portion is opposite the operator upon engagement of said mounting portion with said nose end.

14. A combined rotary hand tool and accessory attachment, comprising:

- a rotary hand tool having an output shaft and a nose end associated with said shaft, said nose end having a shoulder and at least one elongate tooth with a middle portion and a pair of ends, said shoulder and said tooth having a curved portion in the axial direction away from an end of said nose end and defining a curved track therebetween;
- an accessory attachment having a mounting portion configured for releasable attachment to said nose end and including at least one inwardly radially projecting boss dimensioned for slidable engagement in said track, such that, upon engagement, as said attachment is rotated relative to the nose end, approximately ¼ rotation will secure said attachment to the nose end and during said rotation, said at least one tooth is configured so that said at least one boss moves from one of said ends of said at least one tooth to said middle portion and thus is axially displaced away from said nose end.

15. The combination of claim 14 further including a locking assembly on said tool for releasably locking said attachment in position relative to said nose end.

16. The combination of claim 15 wherein said locking assembly includes a biased pin radially extending from said nose end and at least one axial slot on said mounting portion, said pin being constructed and arranged for matingly engaging said at least one slot upon said attachment becoming secured to said nose end.

17. The combination of claim 15 wherein said locking assembly includes a clamp on said mounting portion for gripping said nose end upon engagement with said nose end.

18. An accessory attachment configured for use with a rotary hand tool having an output shaft and a nose end associated with the shaft, the nose end having a shoulder and at least one elongate tooth with a middle portion and a pair of ends, said shoulder and said tooth having a curved portion in the axial direction away from an end of said nose end and defining a curved track therebetween, said attachment comprising:

an accessory attachment including a mounting portion dimensioned for engagement upon the nose end and including at least one inwardly radially projecting boss dimensioned for slidable engagement in the track, such that, upon engagement, as said attachment is rotated relative to the nose end, approximately ¼ rotation will secure said attachment to the nose end and during said rotation, said at least one tooth is configured so that said at least one boss moves from one of said ends of said at least one tooth to said middle portion and thus is axially displaced away from said nose end.

* * * * *

UNITED STATES PATENT AND TRADEMARK OFFICE

CERTIFICATE OF CORRECTION

PATENT NO. : 6,679,658 B2
DATED : January 20, 2004
INVENTOR(S) : Landt

It is certified that error appears in the above-identified patent and that said Letters Patent is hereby corrected as shown below:

Column 2,
Line 61, insert the following paragraph: In the preferred embodiment, each of the teeth 30, 32 is diametrically opposite one another on the circumference of the cylindrical portion 28. However, other positions of the teeth 30, 32 or even the number of teeth may vary to suit the application. --.

Column 5,
Line 31, change “accessory” to -- engagement --.

Signed and Sealed this

Third Day of August, 2004

JON W. DUDAS
*Acting Director of the United States Patent and Trademark Office*